United States Patent
Abad et al.

(10) Patent No.: US 10,915,658 B1
(45) Date of Patent: Feb. 9, 2021

(54) SYSTEM, METHOD, AND COMPUTER-ACCESSIBLE MEDIUM FOR TRAINING MODELS ON MIXED SENSITIVITY DATASETS

(71) Applicant: Capital One Services, LLC, McLean, VA (US)

(72) Inventors: Fardin Abdi Taghi Abad, Champaign, IL (US); Vincent Pham, Champaign, IL (US); Austin Walters, Savoy, IL (US); Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/512,581

(22) Filed: Jul. 16, 2019

(51) Int. Cl.
*G06F 21/62* (2013.01)
*G06N 20/00* (2019.01)

(52) U.S. Cl.
CPC ......... *G06F 21/6245* (2013.01); *G06N 20/00* (2019.01)

(58) Field of Classification Search
CPC .................. G06F 21/6245–6263; G06N 20/00
See application file for complete search history.

(56) References Cited

U.S. PATENT DOCUMENTS

| | | | | |
|---|---|---|---|---|
| 2007/0300306 A1* | 12/2007 | Hussain | ............ | G06F 21/6218 726/27 |
| 2010/0217599 A1* | 8/2010 | Statnikov | ............ | G10L 15/142 704/256 |
| 2011/0265177 A1* | 10/2011 | Sokolan | ............ | G06F 21/6227 726/19 |
| 2012/0150773 A1 | 6/2012 | Dicorpo et al. | | |
| 2013/0167192 A1* | 6/2013 | Hickman | ................ | G06F 21/60 726/1 |
| 2014/0149322 A1* | 5/2014 | LaVoie | ..................... | G06N 5/02 706/12 |
| 2018/0232517 A1* | 8/2018 | Roth | ....................... | H04L 67/10 |

OTHER PUBLICATIONS

"Considerations for Sensitive Data within Machine Learning Datasets," Google Cloud, downloaded from https://cloud.google.com/solutions/sensitive-data-and-ml-datasets#, 10 pages.

Sam Greengard, "Machine Learning Takes on Data Classification and Security," (2018), SecurityRoundtable.org, downloaded from https://www.securityroundtable.org/machine-learning-accenture-interview/, 7 pages.

(Continued)

*Primary Examiner* — Matthew T Henning
(74) *Attorney, Agent, or Firm* — Hunton Andrews Kurth LLP

(57) ABSTRACT

A system can include, for example, a secure data module(s) configured to store sensitive data regarding the user(s), a synthetic dataset generating module(s) configured to generate the synthetic dataset based on the sensitive data, and a control module configured to receive a request from an application for a dataset related to the user(s), provide the request to the synthetic dataset generating module(s), receive the synthetic dataset from the synthetic dataset generating module(s), and provide the synthetic dataset to the application. The synthetic dataset generating module(s) can be configured to generate the synthetic dataset based on the dataset.

20 Claims, 6 Drawing Sheets

(56) References Cited

OTHER PUBLICATIONS

John Overbaugh, "Data protection for non-sensitive and sensitive information," (2011), TechTarget Network, downloaded from https://searchsoftwarequality.techtarget.com/answer/Data-protection-for-non-sensitive-and-sensitive-information, 4 pages.

"Monitor Sensitive Data Across Endpoints and Servers," Panda Data Control, downloaded from https://www.pandasecurity.com/rfiles/newhome2017/b2b/resources/PANDADATACONTROL-DataSheet_GDPR_Focus-EN.pdf, 5 pages.

* cited by examiner

SYSTEM, METHOD, AND COMPUTER-ACCESSIBLE MEDIUM FOR TRAINING MODELS ON MIXED SENSITIVITY DATASETS

FIELD OF THE DISCLOSURE

The present disclosure relates generally to access to data related to a user of a device, and more specifically, to exemplary embodiments of an exemplary system, method, and computer-accessible medium for providing a synthetic dataset related to at least one user of a device.

BACKGROUND INFORMATION

Cell phones, and other wireless electronic devices, are vital communication tools that have become necessary for full participation in modern life. However, they are also powerful tracking devices, storing large amounts of sensitive data regarding the user of the device. For example, photographs taken by a smartphone, which include embedded meta tag data, reside solely on the phone until they are shared or backed up and removed from the phone. Text messages can include sensitive information about the user and/or the person being communicated with. Additionally, many smartphones also have GPS chips, which can be used to trace everywhere a phone has been, and health trackers can be included, which can track certain health information about the user (e.g., the distance and/or speed travelled by the user). Further, demographic information about the user can be stored on the phone, including, gender, age, nationality etc. In addition to sensitive information, a cell phone can also store non-sensitive information such as preference information. For example, preference information related to music, movies, videos and online content viewed can be stored on the device.

Based on the amount of data stored on a device, an application can determine a significant amount of information regarding the user. This can include predictive information for the user. Predictive information can include potential new music, advertisements, likes and dislikes for the user. The vast amount of information stored on a user's device can be beneficial to a user, allowing applications stored on the device to create profiles for the user, which can include the preference information, and which can also be used to predict the information about the user. However, this can present a significant privacy issue for the user as many applications can be subject to hacking, or they can leak information about the user.

Thus, it may be beneficial to provide an exemplary system, method, and computer-accessible medium for providing a synthetic dataset related to at least one user of a device which can overcome at least some of the deficiencies described herein above.

SUMMARY OF EXEMPLARY EMBODIMENTS

A system can include, for example, a secure data module(s) configured to store sensitive data regarding the user(s), a synthetic data generating module(s) configured to generate the synthetic dataset based on the sensitive data, and a control module configured to receive a request from an application for a dataset related to the user(s), provide the request to the synthetic data generating module(s), receive the synthetic dataset from the synthetic data generating module(s), and provide the synthetic dataset to the application. The synthetic data generating module(s) can be configured to generate the synthetic dataset based on the dataset.

In some exemplary embodiments of the present disclosure, the secure data module(s) and the synthetic data generating module(s) can be stored in a trusted zone of the device. The trusted zone can be in hardware of the device. The secure data module(s) can be stored in a trusted zone of the device and the synthetic data generating module(s) can be stored in a trusted zone or an untrusted zone of the device. The application can be stored on the device. The control module can be an operating system for the device. The synthetic data generating module(s) can be a model configured to generate synthetic data that can be similar to the sensitive data. The control module can be further configured to periodically update the model based on an update to the sensitive data.

In certain exemplary embodiments of the present disclosure, the model can be a generic user model, and the control module can be configured to personalize the generic user model based on the user(s). The model can be generated based on information regarding the user(s). The secure data module(s) can be a machine learning model. The control module can be further configured to provide a further application with access to the sensitive data. The sensitive data can include (i) a location of the user(s), (ii) demographic information of the user(s), or (iii) preference information of the user(s). The control module can be further configured to determine rights access of the application and grant access to the sensitive data or the synthetic dataset based on the rights access. The synthetic data generating module(s) can be generated using a transfer learning procedure.

An exemplary system, method and computer-accessible medium for providing a synthetic dataset to an application on a device(s) can include, for example, storing a secure data module(s) in a trusted zone of the device(s), generating a synthetic data generating model(s) based on the secure data module(s), storing the synthetic data generating model(s) in one of (i) the trusted zone or (ii) an untrusted zone of the device(s), receiving a request for a dataset related to a user(s) of the device(s), generating the synthetic dataset based on the dataset using the synthetic data generating model(s), and providing the synthetic dataset to the application on the device(s). The synthetic data generating model(s) can be trained based on information related to the user(s).

Additionally, and exemplary system, method, and computer-accessible medium for providing a synthetic dataset to an application(s) can include receiving a request from the application(s) for information related to user(s) of a device, providing the request to a synthetic data generating model(s), generating synthetic dataset(s) based on the information, and providing the information to the application(s). The synthetic data generating model(s) can be generated based on real information related to the user(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

Figure 1:
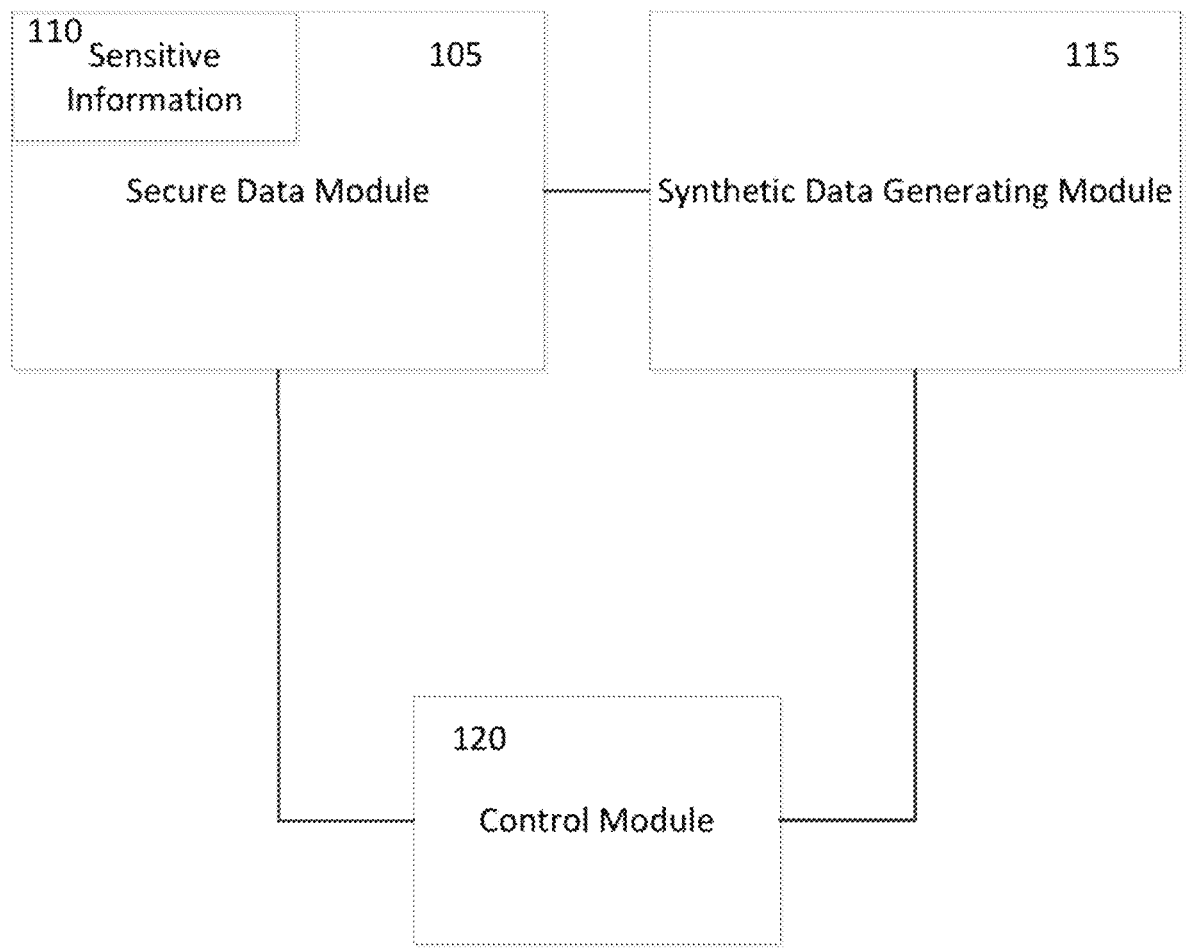
FIG. 1 is a schematic diagram of a system for providing a synthetic dataset related to a user of a device according to an exemplary embodiment of the present disclosure.

When an application is installed on a user's device, it generally will request access to certain functions on the device (e.g., GPS, camera, microphone, etc.) and/or certain information (e.g., demographics, preferences, etc.) about the user of the device. Permissions by themselves can be harmless, and can provide users with a superior mobile experience. For example, personalization can be about offering tailored communication to users based on their interests, location, usage behavior, and more. Mobile applications can let users set up their preferences. Applications can track and observe user engagement, and use it to offer custom recommendations and updates to the users. Thus, user information can be instrumental in the functioning of an application, and for providing a user with a positive experience in using the application. Certain applications (e.g., privileged applications) may require access to the real/sensitive information regarding the user. However, many times, a user might not want to provide other applications with the real/sensitive information.

While applications can require information in order to function properly, or to provide a superior user experience, the application may not need the actual real or sensitive information about the user. The application may also be able to provide the user with the same experience using synthetic data that is similar to the real/sensitive information. For example, if an application is designed to provide relevant local advertisements related to the location of the user, it can use the exact GPS coordinates of the user. However, the application can also use an approximate location of the user to provide the same or similar experience. This can be achieved using a synthetic dataset that can be similar, or sufficiently similar, to the real/sensitive information about the user.

Synthetic data is information that is artificially manufactured rather than generated by real-world events. Synthetic data can be created algorithmically, and it can be used as a stand-in for real datasets. In order to generate a synthetic dataset, real data can be used. A synthetic data generating model can be created which can receive real data as an input. The synthetic data generating model can then generate a synthetic dataset based on the real dataset, which can be indistinguishable from the real dataset during use by the application. The real data can be information regarding the user of the device. The synthetic data generating model can use this real user information to generate synthetic data, which can be provided, upon request, to an application.

In some exemplary embodiments of the present disclosure, the synthetic data generating model can be an untrained model that is loaded/stored on the device of the user. When the user initially sets up the device, real data regarding the user can be gathered, which can be used by the synthetic data generating model to generate an initial synthetic dataset. As the user operates the device, additional real information about the user can be gathered. The synthetic data generating model can be periodically updated with the new information in order to retrain the synthetic data generating model to provide better synthetic data. For example, at a certain point during the day (e.g., overnight when the device is most likely not being used), the synthetic data generating model can receive the new and/or revised user information. The synthetic data can then be retrained based on the new/revised data. Alternatively, or in addition, the synthetic data can receive the new/revised information on device power on, or when the device is backed up.

Instead of training a completely new model, a previously-generated model can be used, which can be updated based on the user. For example, the exemplary system, method, and computer-accessible medium can employ transfer learning to save on the computing costs of generating a new synthetic data generating model. Transfer learning is a machine learning method where a model developed for a task is reused as the starting point for a model on a second task. Pre-trained models can be used as the starting point on computer vision and natural language processing tasks given the vast compute and time resources required to develop neural network models on these problems, and from the huge jumps in skill that they provide on related problems. This can facilitate an optimization that allows rapid progress or improved performance when generating the synthetic data.

The synthetic data generating model can be used to generate a static synthetic dataset. For example, after the synthetic data generating model is trained or retrained, a synthetic dataset can be generated and stored on the device. An application requesting user information can be directed toward the synthetic dataset to receive the requested data. Alternatively, there can be no static synthetic dataset on the device. When an application requests user information, the request can be provided to the synthetic data generating model. The synthetic data generating model can then generate a synthetic dataset that is similar to the requested information by the application. This can increase the real-time computing requirements of the user device, as the synthetic data generating model will need to be run in real time. However, it can decrease the storage requirements as a static synthetic dataset is not stored on the device.

The operating system of the device can be used to facilitate access to user data by the application. For example, if an application needs access to user information, it can make a request to the operating system of the device. The operating system can determine if the application needs access to the real/sensitive information, or if synthetic data can be substituted. If real/sensitive data is needed, then the operating system can (i) provide the application with the requested information based on the type of application or (ii) request approval by the user of the device. If synthetic data can be used, the operating system can request the synthetic data from the synthetic data generating model, and provide the synthetic data back to the application. Any additional requests for user information can include providing the same level of access as the initial request (e.g., if the application was denied access to the real/sensitive data on the first request, and synthetic data was provided, all future requests can include only access to the synthetic data).

FIG. 1 is a schematic diagram of a system for providing a synthetic dataset related to a device according to an exemplary embodiment of the present disclosure. The exemplary system can include a secure data module 105. Secure data module 105 can include sensitive information 110. Sensitive information 110 can be stored locally in secure data module 105, or sensitive information 110 can be stored in a secure storage area. Secure data module 105 can then be used to access sensitive information based on the task being performed. For example, if real/sensitive information is needed by an application, secure data module 105 can facilitate access to sensitive information 110. However, if synthetic data can be substituted for sensitive information 110, then secure data module 105 can facilitate access to sensitive information 110 in order to generate synthetic data.

As shown in FIG. 1, the exemplary system can include synthetic data generating module 115. Synthetic data generating module 115 can include a machine learning model that can be used to generate synthetic data based on real information. Synthetic data generating module 115 can communicate directly with secure data generating module 105 to gain access to sensitive information 110. For example, when an application requests access to sensitive information 110, and a determination has been made that synthetic data can be substituted for sensitive information 110, synthetic data generating module can send a request to secure data module 110 for temporary access to sensitive information 110 in order to generate the requested data.

While synthetic data generating module 115 can communicate directly with secure data module 105, an intermediary between the two modules can also be used. In particular, control module 120 can be used to facilitate communication between synthetic data generating module 115 and secure data module 105. Synthetic date generating module 115 can send a request to control module 120, which can be an operating system of the device, requesting temporary access to sensitive information 110. Control module 120, through secure data module 105, can provide the temporary access to sensitive information 110 to allow synthetic data generating module 115 to generate the synthetic data. Access to sensitive information 110 can be limited to particular information of sensitive information 110 depending on the request. For example, if synthetic data related to a user's geo location is needed, control module 120 can facilitate access to only the user's actual geo location in sensitive information 110, while preventing access to all other categories of sensitive information.

Figure 2A:
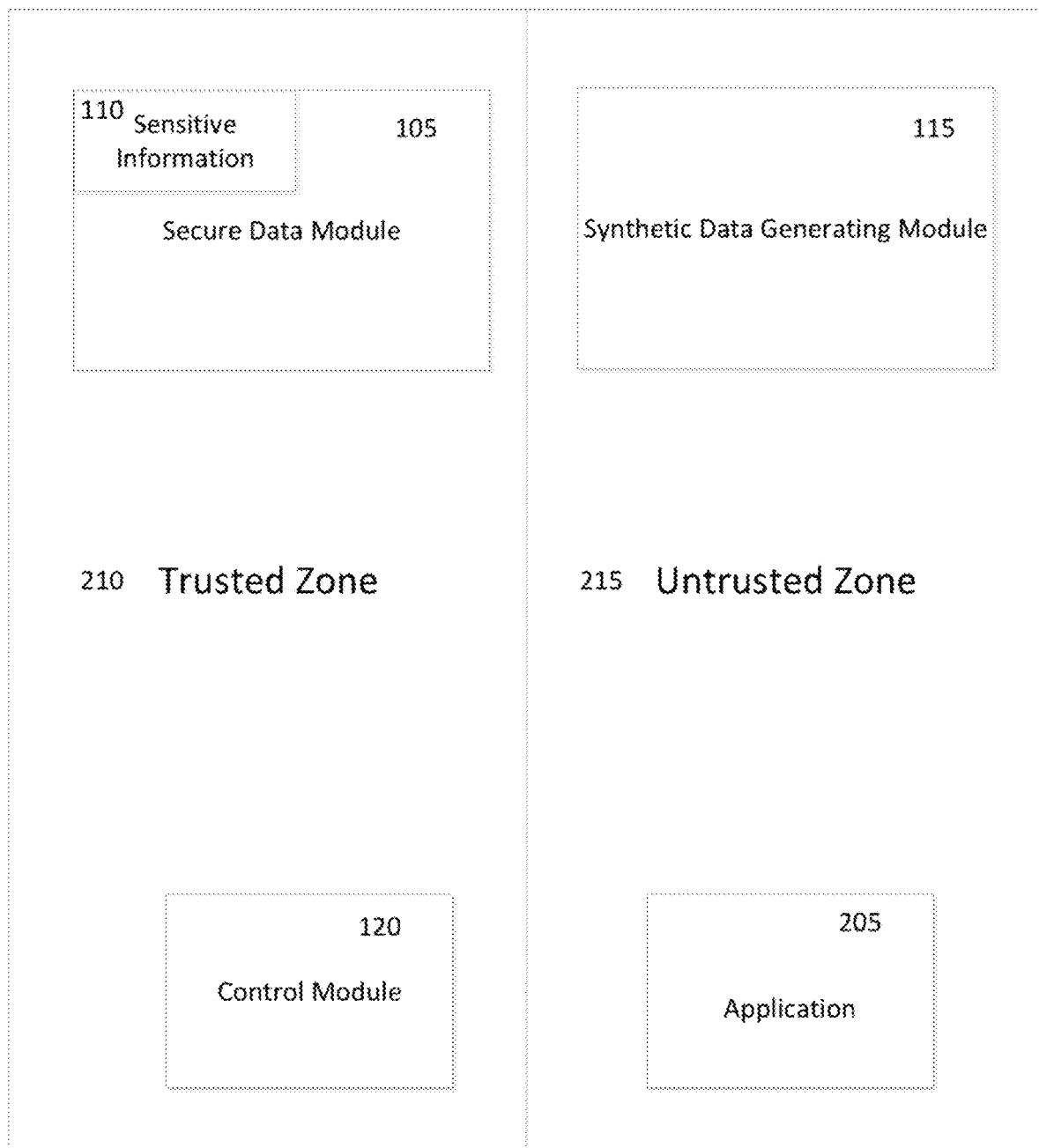
FIG. 2A is a schematic diagram of the exemplary system showing a trusted hardware zone and an untrusted hardware zone where the synthetic data generating model is stored in the untrusted zone according to an exemplary embodiment of the present disclosure.

FIG. 2A is a schematic diagram of the exemplary system showing a trusted hardware zone 210 and an untrusted hardware zone 215. For example, trusted zone 210 can provide system-wide hardware isolation for trusted software. Trusted zone 210 can create an isolated secure world which can be used to provide confidentiality and integrity to the exemplary system. It can be used to protect high-value code and data for diverse use cases including authentication, payment, content protection, and enterprise. For example, trusted zone 210 can provide secure storage for sensitive information 110. Secure data module 105 can be stored in trusted zone 210, which can be used to access sensitive information 110. The use of a trusted zone facilitates the exemplary system to cordon off sensitive information from any applications stored on the device.

Trusted zone 210 can be created using hardware, and can thus be a hardware trusted zone. An example of a hardware trusted zone is the Arm TrustZone. TrustZone technologies can be integrated into various Arm-based processor, including Arm Cortex-A core, supporting high-performance applications processors, with TrustZone technology for Cortex-A processors.

Hardware logic present in trusted zone 210 can ensure that no secure world resources can be accessed by the non-secure world components, enabling a strong security perimeter to be built between the two areas. A design that places sensitive resources in the secure world, and implements robust software running on the secure processor cores, can protect almost any asset against many of the possible attacks. This includes those which are normally difficult to secure, such as passwords entered using a keyboard or touch-screen, and sensitive information (e.g., sensitive information 110). The use of hardware architecture can facilitate extensions that have been implemented in processor cores. This can facilitate a single physical processor core to safely and efficiently execute code from both the "normal world" and the "secure world" in a time-sliced fashion. This can remove the need for a dedicated security processor core, which saves silicon area and power. It can also allow high performance security software to run alongside the "normal world" operating environment. Each physical processor core can provide multiple (e.g., two, three, four, etc.) virtual cores. If two virtual cores are used, one core can be considered "non-secure" and the other can be considered "secure." A mechanism can be included to robustly context switch between them. The security state can be encoded on the system bus, which enables trivial integration of the virtual processors into the system security mechanism; the "non-secure" virtual processor can only access "non-secure" system resources, but the "secure" virtual processor can see all resources.

Control module 120 can be used to facilitate access to trusted zone 210. Control module 120 can communicate with untrusted zone 215, including one or more applications 205 stored in untrusted zone 215, as well as synthetic data generating module 115, which as shown in FIG. 2A, can be stored in untrusted zone 215. Control module 120 can be located on trusted zone 210, and can be given access to secure data module 105 on trusted zone 210. Alternatively, control module 210 can be located on untrusted zone 215. Additionally, multiple control modules, which can be controlled by a single operating system, can be included, including one located on trusted zone 210 and one located on untrusted zone 215. The multiple control modules can communicate with one another to facilitate communication between trusted zone 210 and untrusted zone 215.

If synthetic data generating module 115 is stored on untrusted zone 215, as shown in FIG. 2A, synthetic data generating module 115 can communicate with control module 120 to gain access to sensitive information 110 located on trusted zone 210. For example, application 205 can request access to user data. The request can be sent to control module 120. Control module 120 can determine the level of access to be granted to application 205. For example, if privileged status is granted to application 205, then control module can request the real user data from sensitive information 110, and provide the real user data to application 205. If control module 120 determines that application 205 is not a privileged application, then control module can provide the request for user data to synthetic data generating module 115. Synthetic data generating module 115 can determine if a dataset exists that corresponds to the user information requested by application 205. If the synthetic dataset already exists, then synthetic data generating module 115 can provide the requested information to control module 120, which in turn can provide it to application 205. If the synthetic dataset does not exist, then synthetic data generating module 115 can generate the new synthetic dataset based on information already contained in synthetic data generating module 115. This new synthetic dataset can be provided to application 205 through control module 120.

While synthetic data generating module 115 can be robust enough to handle most information requests from application 205, it can be possible that synthetic data generating module does not have sufficient, information (e.g., sufficient training) to generate the requested synthetic dataset. In such a case, synthetic data generating module 115 can be updated (e.g., retrained) based on sensitive information 110. This can be performed periodically (e.g., at a particular time during the day), or this can be performed whenever a request is made by application 205. Synthetic data generating module 115 can send the update request to control module 120, which can facilitate access to sensitive information 110 (e.g., through secure data module 105).

Figure 2B:
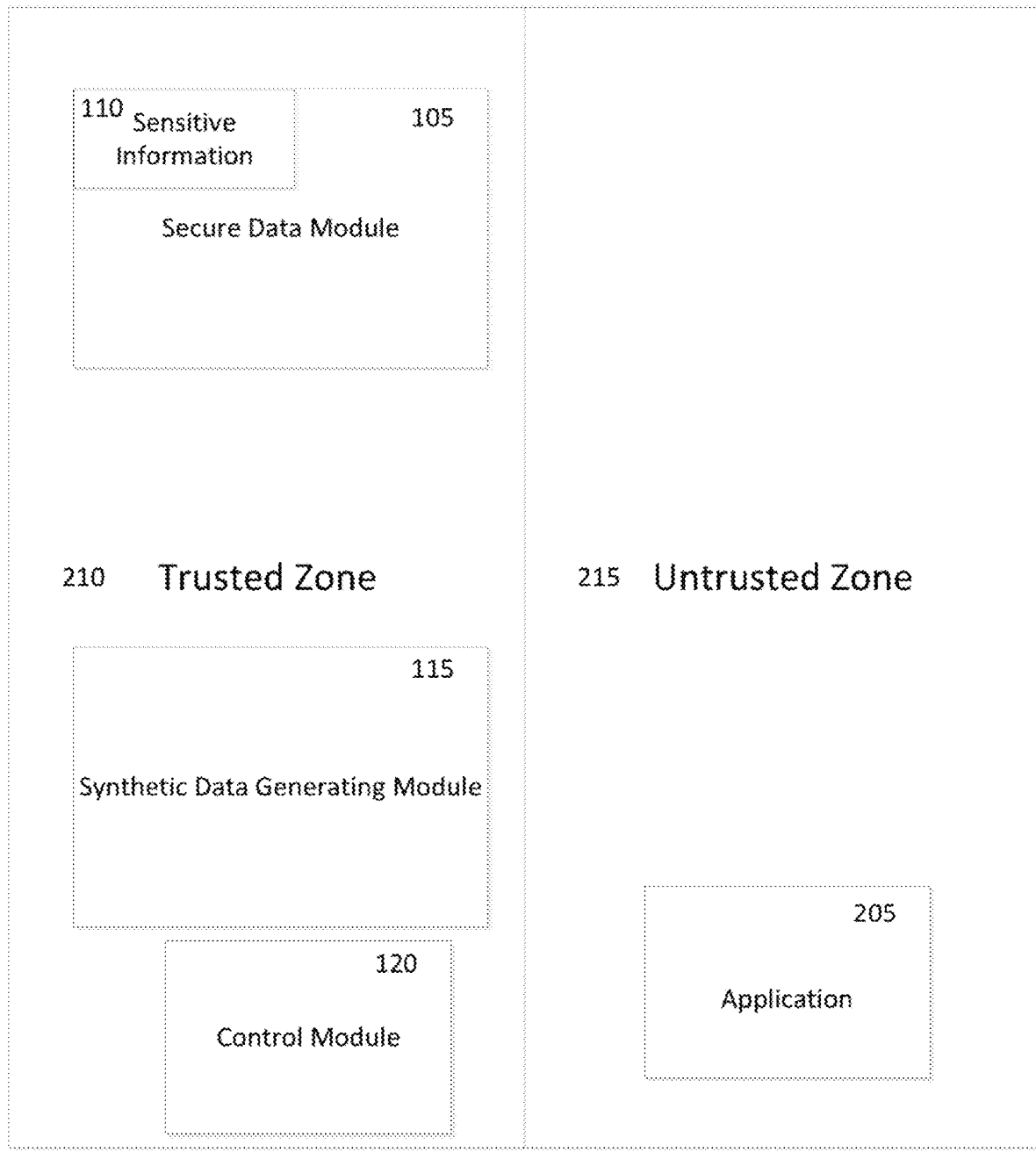
FIG. 2B is a schematic diagram of the exemplary system showing a trusted hardware zone and an untrusted hardware zone where the synthetic data generating model is stored in the trusted zone according to an exemplary embodiment of the present disclosure.

FIG. 2B is a schematic diagram of the exemplary system showing a trusted hardware zone and an untrusted hardware zone where synthetic data generating model 115 is stored in the trusted zone. Such a case can be similar to that of FIG. 2A, except that the dataset generated by synthetic data generating module 115 can be stored either in trusted zone 210 or untrusted zone 215. If the dataset is also stored in trusted zone 210, then the dataset can be transferred to untrusted zone 215 only upon request by application 205. Thus, even the synthetic dataset can be secured and protected.

FIG. 2A shows synthetic data generating model 115 being stored un an untrusted zone and FIG. 2B shows synthetic data generating model 115 being stored in a trusted zone. However, synthetic data generating model 115 can be moved back and forth between the trusted zone and the untrusted zone for various exemplary training purposes. For example, to provide synthetic data generating model 115 access the sensitive information, synthetic data generating model 115 can be moved from the untrusted to the trusted zone (e.g., for training of synthetic data generating model 115). Once access to the sensitive information is no longer needed, synthetic data generating model 115 can be moved back to the untrusted zone.

As shown in FIGS. 2A and 2B, trusted zone 210 and untrusted zone 215 can both be implemented using a hardware approach. Alternatively, trusted and untrusted zone can be generated using software only. For example, control module 120 can restrict access to the data using permissions of the requesting application. A software-based trusted zone can be more efficient as the storage size can be modified by the control module based on the amount of information being stored. For example, as the amount of real/sensitive user information increases, control module 120 can increase the size of the software-based trusted zone.

As described above, the use of a trusted zone (e.g., a hardware-based or software-based trusted zone) can facilitate secure control of the user's real/sensitive information. Thus, applications can be prevented from gaining access to the real/sensitive information. Additionally, if the device is lost or stolen, no one else can access the user's real/sensitive information as it is all stored in the trusted zone.

Figure 3:
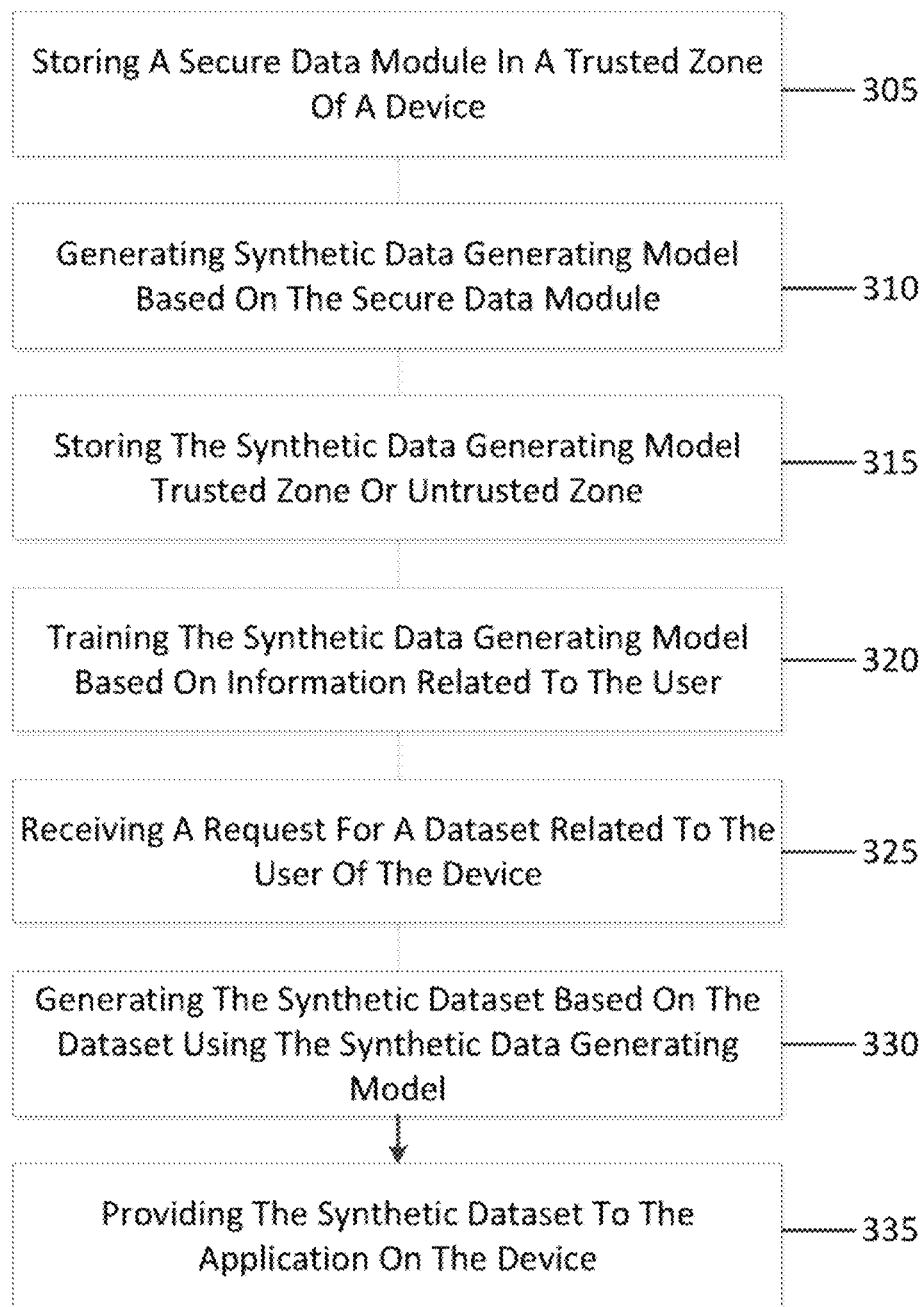
FIGS. 3 and 4 are flow diagrams of methods for providing a synthetic dataset to an application on a device according to an exemplary embodiment of the present disclosure.

FIG. 3 is a flow diagram of a method 300 for providing a synthetic dataset to an application on a device according to an exemplary embodiment of the present disclosure. For example, at procedure 305, a secure data module can be stored in a trusted zone of a device. At procedure 310, a synthetic data generating model can be generated based on the secure data module. At procedure 315, the synthetic data generation module can be stored in the trusted zone of the device or in an untrusted zone of the device. At procedure 320, the synthetic data generating model can be trained based on information related to the user of the device. At procedure 325, a request for a dataset related to the user of the device can be received (e.g., from an application on the device). At procedure 330, a synthetic dataset can be generated using the synthetic data generating model. At procedure 335, the synthetic dataset can be provided to the requesting application.

Figure 4:
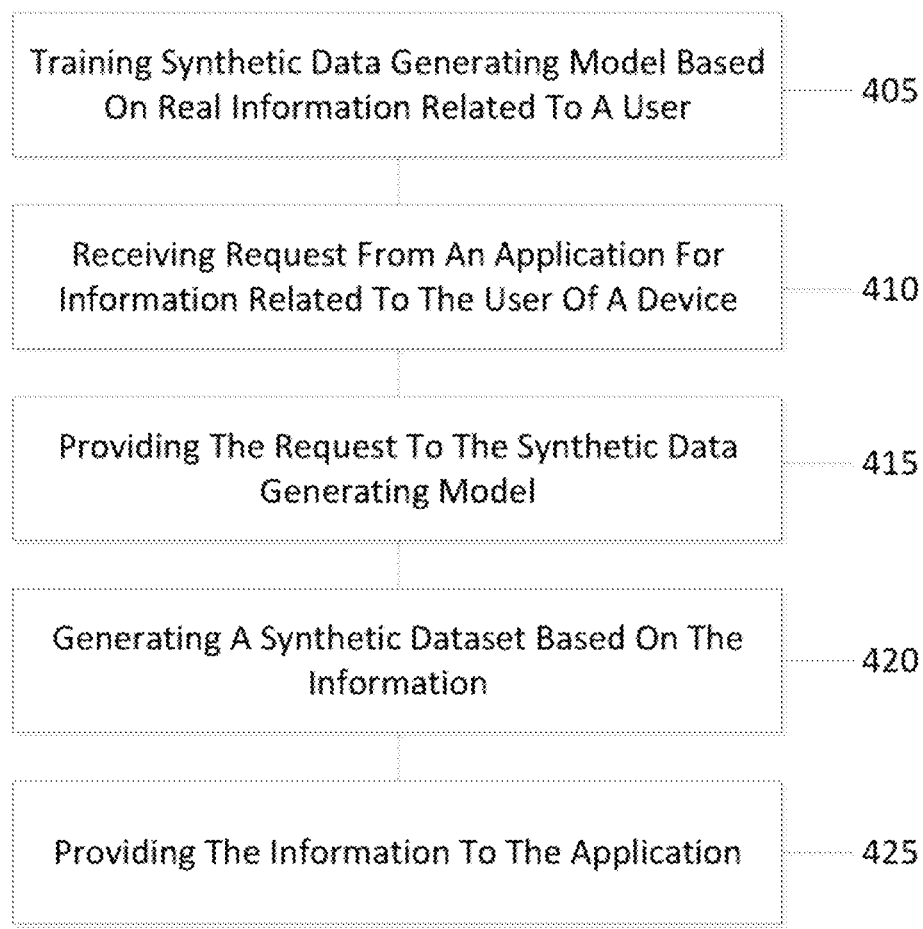

FIG. 4 is a flow diagram of a method 400 for providing a synthetic dataset to an application on at least one device according to an exemplary embodiment of the present disclosure. For example, at procedure 405, a synthetic data generating model can be trained on real information related to a user (e.g., a user of a device). At procedure 410, a request can be received (e.g., by a control module or an operating system) from an application on the device for information related to the user. At procedure 415, the request can be provided to the synthetic data generating model. At procedure 420, a synthetic dataset can be generated. At procedure 425, the synthetic dataset can be provided to the application.

Figure 5:
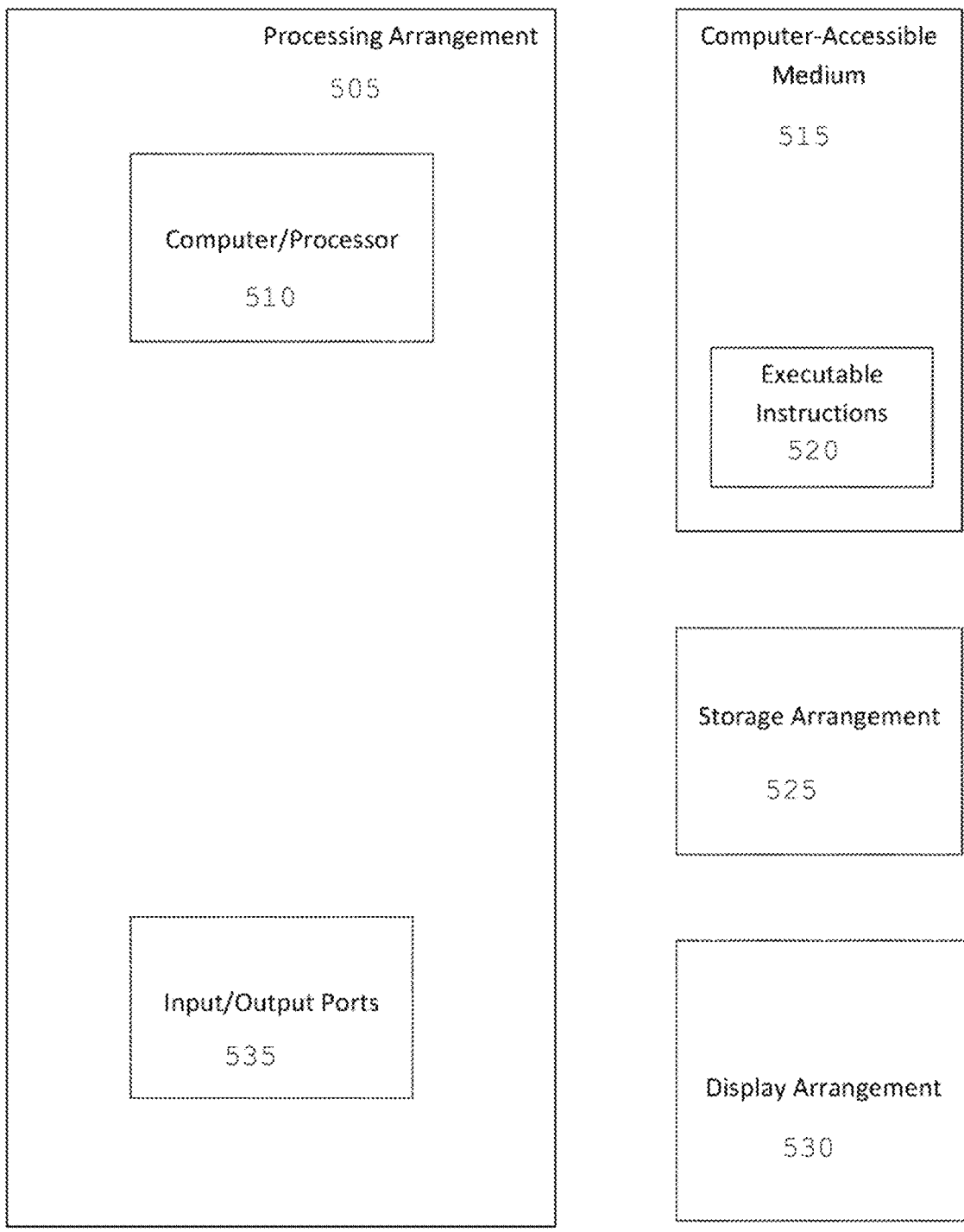
FIG. 5 is an illustration of an exemplary block diagram of an exemplary system in accordance with certain exemplary embodiments of the present disclosure.

FIG. 5 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 505. Such processing/computing arrangement 505 can be, for example entirely or a part of, or include, but not limited to, a computer/processor 510 that can include, for example one or more microprocessors, and use instructions stored on a computer-accessible medium (e.g., RAM, ROM, hard drive, or other storage device).

As shown in FIG. 5, for example a computer-accessible medium 515 (e.g., as described herein above, a storage device such as a hard disk, floppy disk, memory stick, CD-ROM, RAM, ROM, etc., or a collection thereof) can be provided (e.g., in communication with the processing arrangement 505). The computer-accessible medium 515 can contain executable instructions 520 thereon. In addition or alternatively, a storage arrangement 525 can be provided separately from the computer-accessible medium 515, which can provide the instructions to the processing arrangement 505 so as to configure the processing arrangement to execute certain exemplary procedures, processes, and methods, as described herein above, for example.

Further, the exemplary processing arrangement 505 can be provided with or include an input/output ports 535, which can include, for example a wired network, a wireless network, the internet, an intranet, a data collection probe, a sensor, etc. As shown in FIG. 5, the exemplary processing arrangement 505 can be in communication with an exemplary display arrangement 530, which, according to certain exemplary embodiments of the present disclosure, can be a touch-screen configured for inputting information to the processing arrangement in addition to outputting information from the processing arrangement, for example. Further, the exemplary display arrangement 530 and/or a storage arrangement 525 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A system for providing a synthetic dataset related to at least one user of a device, comprising:
    at least one secure data module configured to store sensitive data regarding the at least one user;
    at least one synthetic dataset generating module configured to generate the synthetic dataset based on the sensitive data;
    a control module configured to:
        receive a request from an application for a dataset related to the at least one user;
        provide the request to the at least one synthetic dataset generating module;
        receive the synthetic dataset from the at least one synthetic dataset generating module, wherein the synthetic dataset and the sensitive data are indistinguishable to the application during use of the synthetic dataset by the application; and
        provide the synthetic dataset to the application.

2. The system of claim 1, wherein the at least one synthetic dataset generating module is configured to generate the synthetic dataset based on the dataset.

3. The system of claim 1, wherein the at least one secure data module and the at least one synthetic dataset generating module are stored in a trusted zone of the device.

4. The system of claim 3, wherein the trusted zone is in hardware of the device.

5. The system of claim 1, wherein the at least one secure data module is stored in a trusted zone of the device and the at least one synthetic dataset generating module is stored in an untrusted zone of the device.

6. The system of claim 1, wherein the application is stored on the device.

7. The system of claim 1, wherein the control module is an operating system for the device.

8. The system of claim 1, wherein the at least one synthetic dataset generating module is a model configured to generate synthetic data that is similar to the sensitive data.

9. The system of claim 8, wherein the control module is further configured to periodically update the model based on an update to the sensitive data.

10. The system of claim 8, wherein the model is a generic user model, and wherein the control module is configured to personalize the generic user model based on the at least one user.

11. The system of claim 8, wherein the model is generated based on information regarding the at least one user.

12. The system of claim 8, wherein the at least one secure data module is a machine learning model.

13. The system of claim 1, wherein the control module is further configured to provide a further application with access to the sensitive data.

14. The system of claim 1, wherein the sensitive data includes at least one of (i) a location of the at least one user, (ii) demographic information of the at least one user, or (iii) preference information of the at least one user.

15. The system of claim 1, wherein the control module is further configured to:
    determine rights access of the application; and
    grant access to the sensitive data or the synthetic dataset based on the rights access.

16. The system of claim 1, wherein the at least one synthetic dataset generating module is generated using a transfer learning procedure.

17. A method for providing a synthetic dataset to an application on at least one device, comprising:
    storing at least one secure data module in a trusted zone of the at least one device;
    generating at least one synthetic dataset generating model based on the at least one secure data module;
    storing the at least one synthetic dataset generating model in one of (i) the trusted zone or (ii) an untrusted zone of the at least one device;
    receiving a request for a dataset related to at least one user of the at least one device;
    generating the synthetic dataset based on the dataset using the at least one synthetic dataset generating model, wherein the synthetic dataset is indistinguishable from a real dataset related to the at least one user during use by the application; and
    providing the synthetic dataset to the application on the at least one device.

18. The method of claim 17, further comprising training the at least one synthetic data generating model based on information related to the at least one user.

19. A non-transitory computer-accessible medium having stored thereon computer-executable instructions for providing a synthetic dataset to at least one application, wherein, when a computer arrangement executes the instructions, the computer arrangement is configured to perform procedures comprising:
    receiving a request from the at least one application for information related to at least one user of a device;
    providing the request to at least one synthetic dataset generating model;
    generating the synthetic dataset based on the information, wherein the synthetic dataset is indistinguishable from real information related to the at least one user during use by the application; and
    providing the information to the at least one application.

20. The computer-accessible medium of claim 19, wherein the computer arrangement is further configured to train the at least one synthetic dataset generating model based on real information related to the at least one user.

\* \* \* \* \*